(No Model.)  5 Sheets—Sheet 1.
W. A. LAIDLAW.
BALING PRESS.
No. 408,115. Patented July 30, 1889.
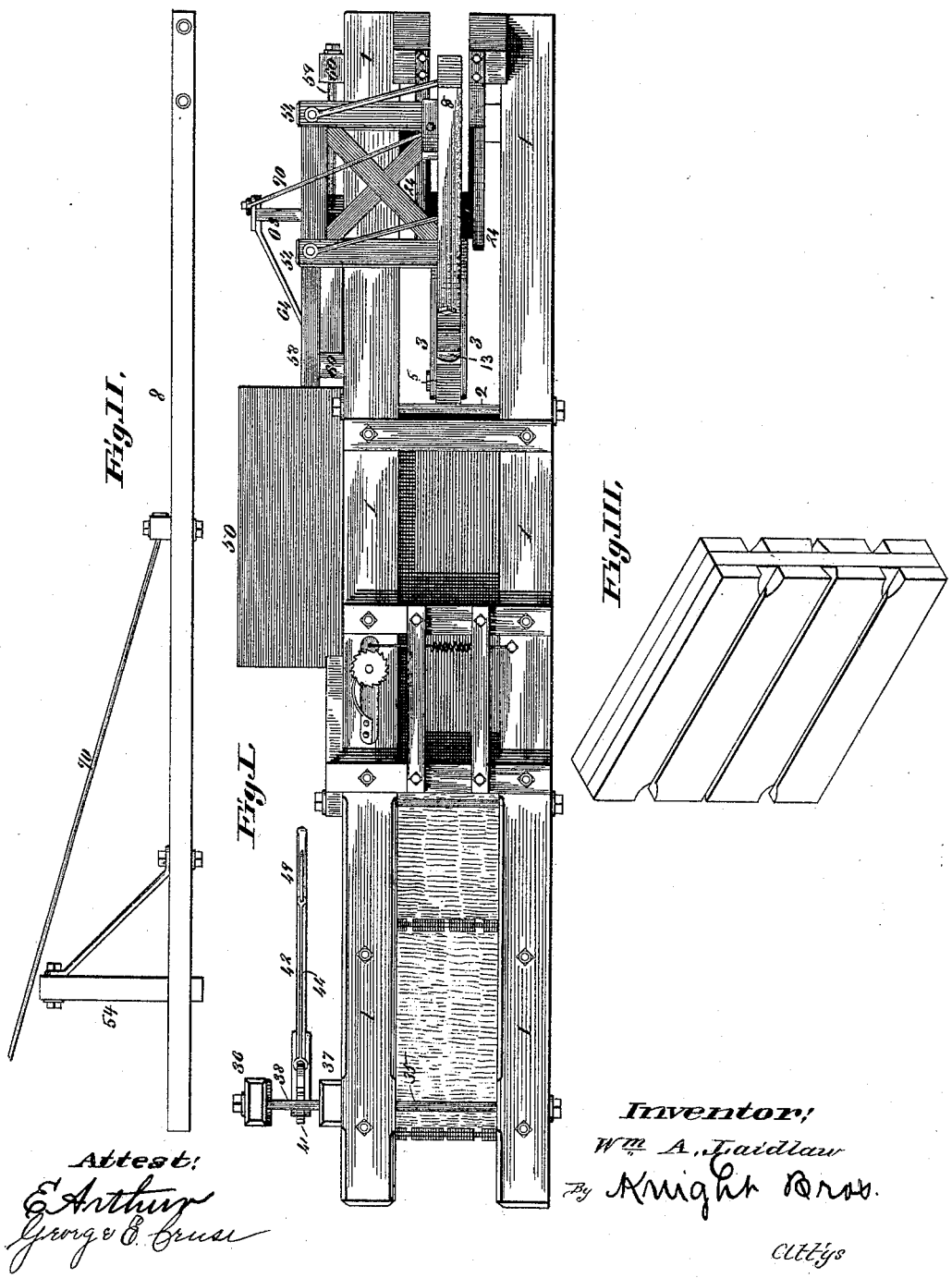
Attest:
E. Arthur
George E. Cruse
Inventor:
Wm. A. Laidlaw
By Knight Bros.
Att'ys

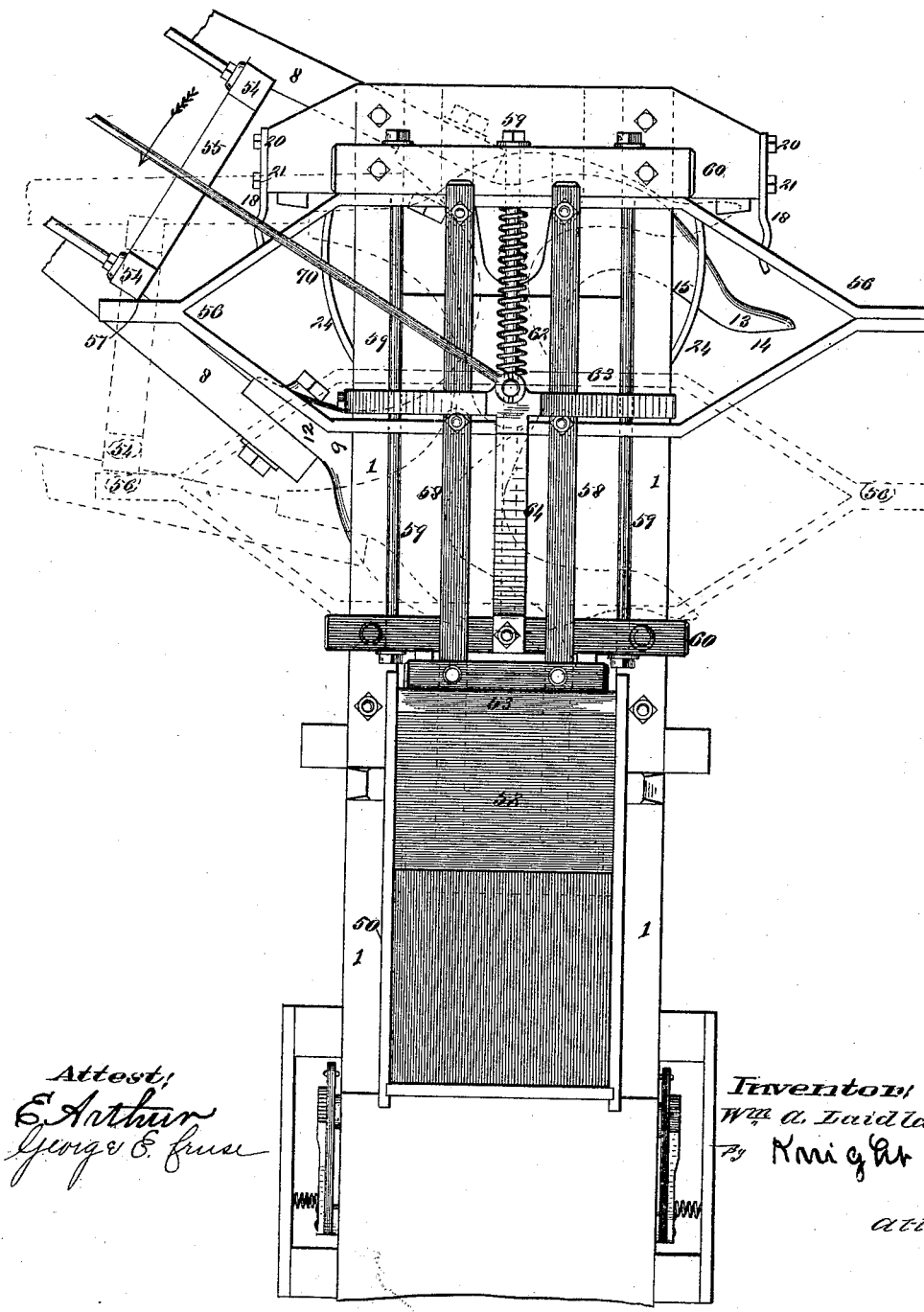

(No Model.)
W. A. LAIDLAW.
BALING PRESS.
No. 408,115.
5 Sheets—Sheet 3.
Patented July 30, 1889.
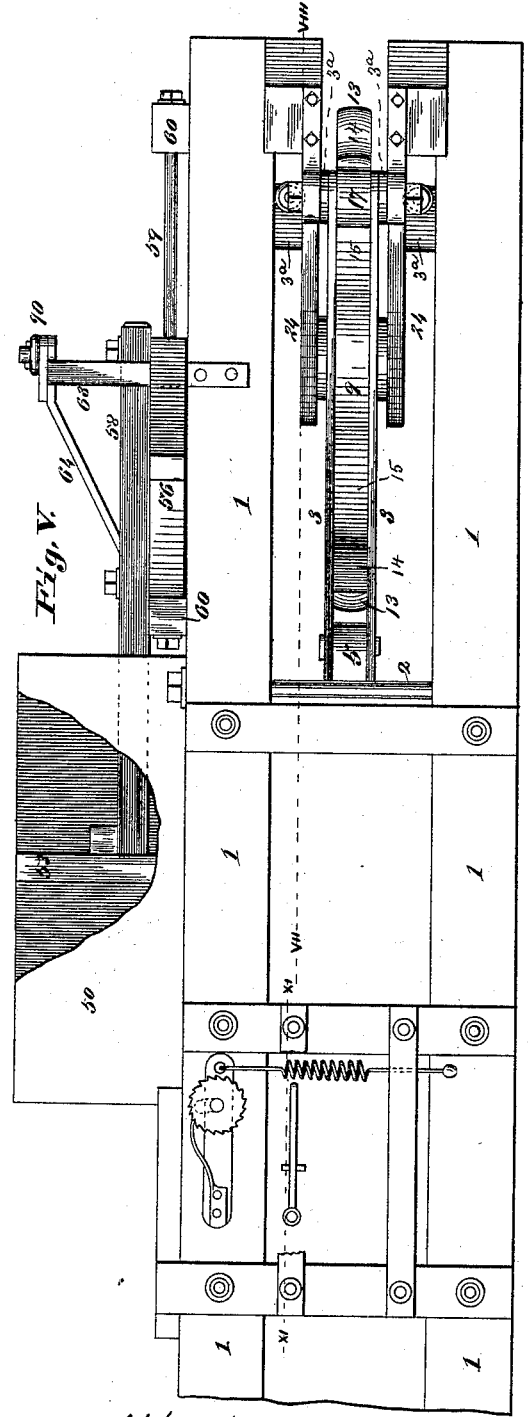
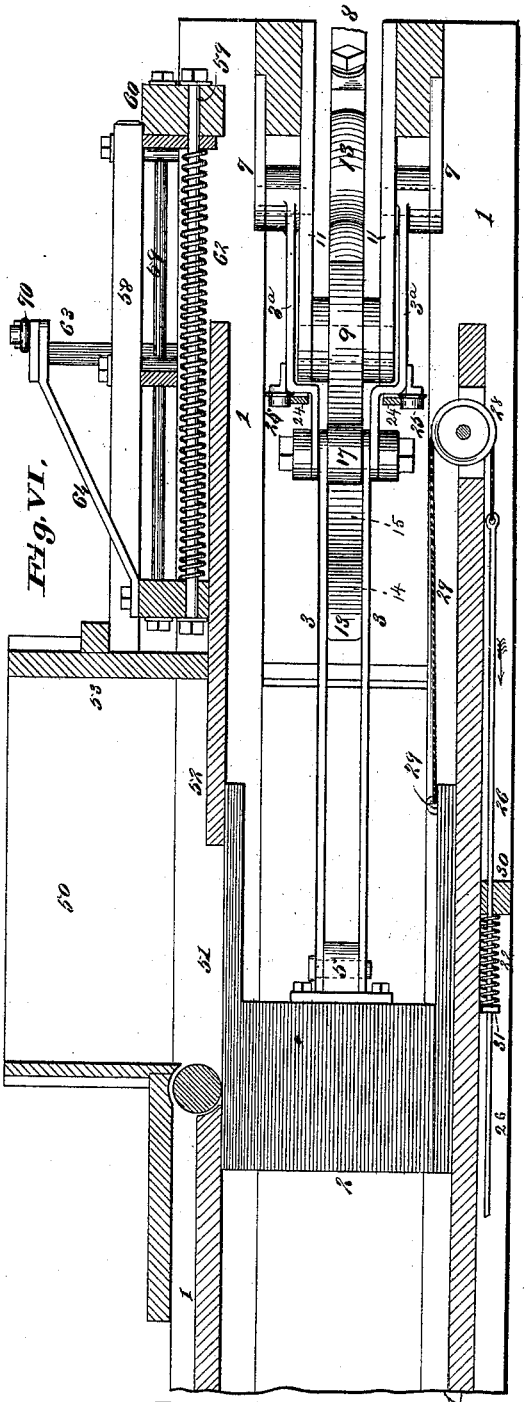
Attest:
E. Arthur
George Fuse
Inventor:
Wm. A. Laidlaw
By Knight Bros.
attys (No Model.)  5 Sheets—Sheet 4.
W. A. LAIDLAW.
BALING PRESS.
No. 408,115. Patented July 30, 1889.
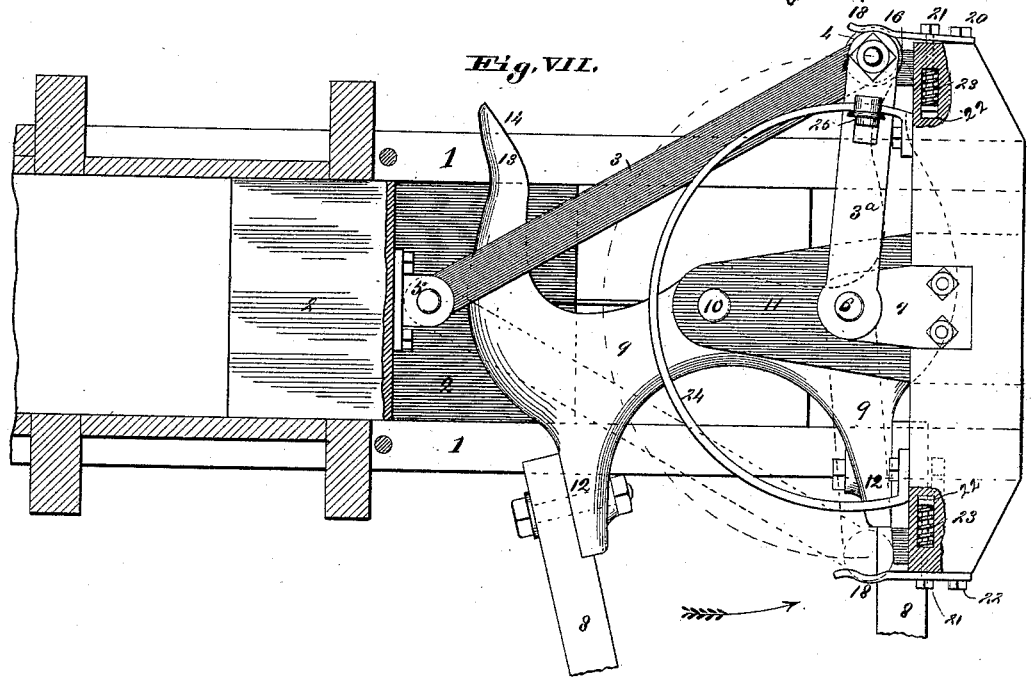
Fig. VII.
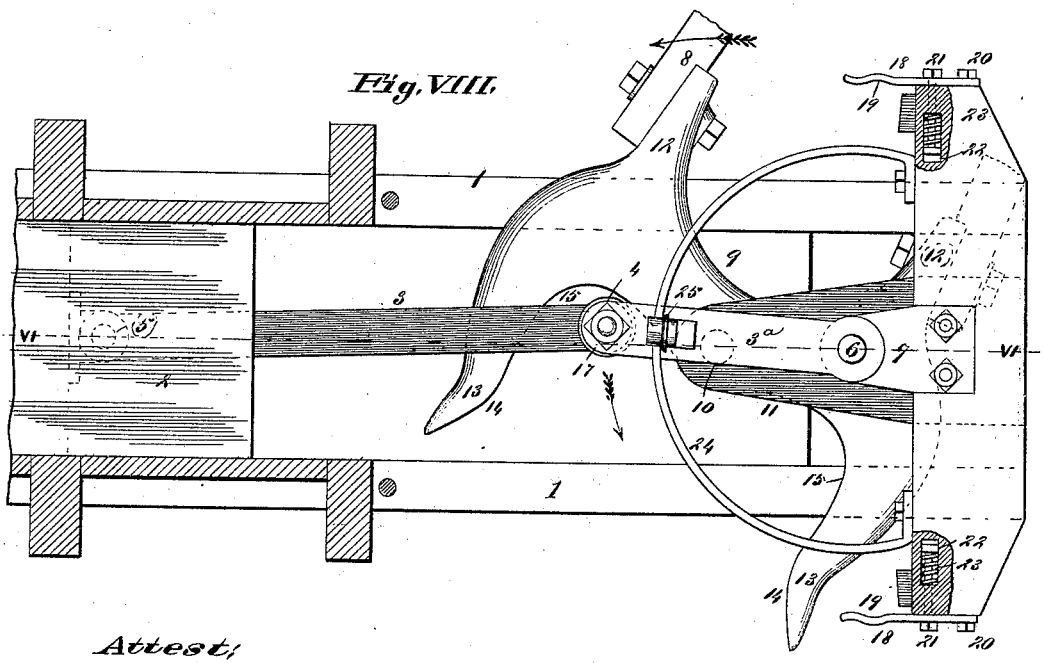
Fig. VIII.
Attest:
E. Arthur
George Fruse
Inventor:
Wm. A. Laidlaw
By Knight Bros.
Attys (No Model.) 5 Sheets—Sheet 5.
W. A. LAIDLAW.
BALING PRESS.
No. 408,115. Patented July 30, 1889.
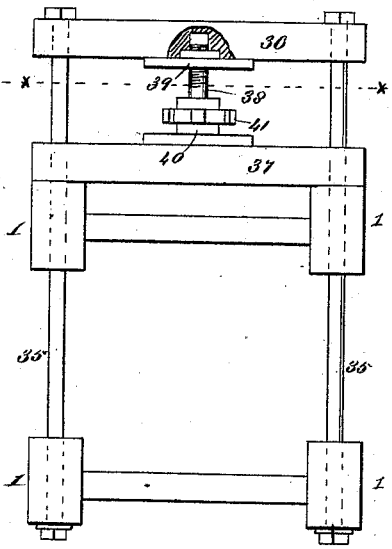
Fig. IX.
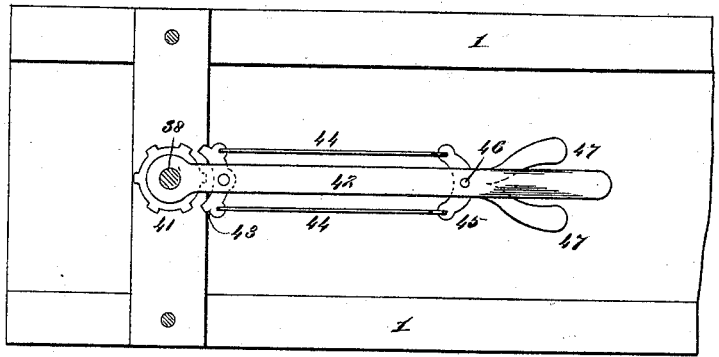
Fig. X.
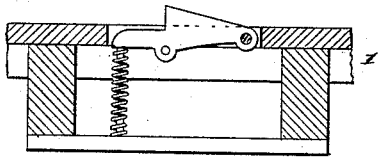
Fig. XI.
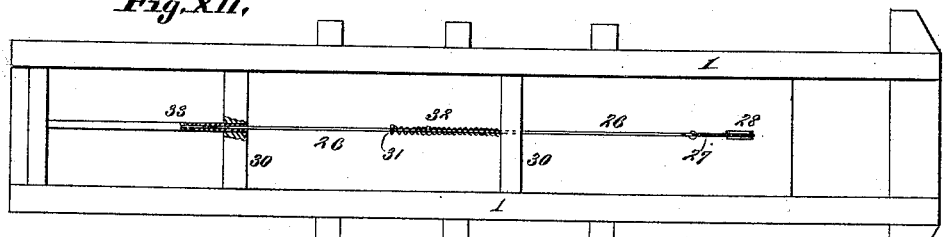
Fig. XII.
Attest:
E. Arthur
George Fuse
Inventor:
Wm. A. Laidlaw
By Knight Bros.
Att'ys

UNITED STATES PATENT OFFICE.

WILLIAM A. LAIDLAW, OF CHEROKEE, KANSAS.

BALING-PRESS.

SPECIFICATION forming part of Letters Patent No. 408,115, dated July 30, 1889.

Application filed November 14, 1888. Serial No. 290,772. (No model.)

*To all whom it may concern:*

Be it known that I, WILLIAM A. LAIDLAW, of Cherokee, in the county of Crawford and State of Kansas, have invented a certain new and useful Improvement in Baling-Presses, of which the following is a full, clear, and exact description, reference being had to the accompanying drawings, forming part of this specification, and in which—

Figure I is a side elevation of my improved press. Fig. II is a side elevation of the sweep. Fig. III is a perspective view of the division-board. Fig. IV is a detail top plan view of the sweep end of the press, illustrating the operation of the parts. Fig. V is a side eletion of the sweep end of the press, with part of the receiving funnel or chamber broken away. Fig. VI is a vertical section of the sweep end of the press, this section being taken on line VI VI, Fig. VIII. Figs. VII and VIII are horizontal sections of the sweep end of the press, taken on line VII VIII, Fig. V, the two figures showing the parts in different positions. Fig. IX is a view showing the rear or delivery end of the press. Fig. X is a detail horizontal section taken on line X X, Fig. IX. Fig. XI is a detail section taken on line XI XI, Fig. V. Fig. XII is a detail bottom view of the press, illustrating the device for insuring a return movement of the traverser where there is not sufficient force in the pressed material to accomplish this.

My invention relates to certain improvements in presses, intended more particularly for use in baling hay and straw, but which may be used for baling other materials; and my invention consists in features of novelty hereinafter fully described, and pointed out in the claims.

Referring to the drawings, 1 represents the main body of the press, 2 the traverser, and 3 the inner links, and 3ª the bent outer links of the pitman, which is jointed at 4 and which is pivoted at 5 by its inner end to the traverser, and at 6 by its outer end to a fixed bracket 7, secured to the body of the press.

8 represents the sweep and 9 the sweep-head. The head is pivoted at 10 to plates or brackets 11 secured to the body of the press. The head consists of a casting having outer extensions 12, to which the sweep is secured, and inwardly-extending prongs or fingers 13. These prongs or fingers 13 are each formed with a convex surface 14 and a concave surface 15.

As the sweep is moved in the direction indicated by the arrow, Fig. VII, one of the prongs or fingers 13 comes against the joint 4 of the pitman 3, as shown at 16, Fig. VII, and as the sweep continues to move around in this direction the joint is moved inwardly, bringing the two parts of the pitman into line, and thus forcing the traverser forward. As this movement takes place, the point of bearing at 4 between the pitman and the prong or finger passes first along the convex surface 14 of the finger and then along the concave portion 15. In this way the point of bearing between the sweep-head and pitman approaches the pivot of the sweep as the traverser advances, and thus speed is converted into power—that is to say, as the joint 4 moves on the outer convex end of the prong or finger 13 the movement of the traverser is rapid, (not much pressure being required at the commencement of the movement of the traverser,) and as the point of bearing passes to the convex portion of the finger or prong, the movement of the traverser will be much less rapid, but the power will be increased, as the point of bearing between the pitman and sweep-head is thus permitted to approach the pivot of the latter. As soon as the joint 4 comes in line with the two parts of the pitman, the rebound of the traverser carries the joint over to the other side of the machine, or to the position shown in dotted lines, Fig. VII. Then, the sweep being moved in the other direction, the other prong or finger comes in contact with the joint 4 and moves the traverser forward again in the same manner as just described.

If preferred, a friction-roller 17 may be placed at the joint 4 to receive the impact of the prongs or fingers 13.

As the traverser rebounds, the joint 4 is received by spring-arms 18, secured to the opposite sides of the press, as shown clearly in Figs. VII and VIII, these arms serving to prevent a sudden shock or jar as the traverser reaches the limit of its backward movement. My preferred manner of constructing these spring-arms 18 is to employ a plate of metal shaped to form concave bearings 19 for the joint, each plate being connected to the body of the press by bolts 20 and 21. The bolts 21 fit at their inner ends in sockets 22 in the body, and between their inner ends and the outer ends of the sockets are placed coil-springs 23. These springs permit the arms 18 to move outwardly slightly as the joint 4 strikes them, but yet offers sufficient resistance to overcome the sudden jar or concussion, as stated.

24 represents semicircular tracks secured above and beneath the outer part of the pitman, between the bent portions of the outer links and the joint to the body of the press, upon which bears flanged rollers 25, secured to the outer part of the pitman. The object of this is to form a guide for the pitman and keep it from sagging at the joint.

It sometimes occurs that the reaction of the material which is being baled is not sufficient to return the traverser to the limit of its backward movement. For this reason I apply a device to my press which will accomplish this purpose, and which preferably consists of a rod 26, connected to the traverser (see Figs. VI and XII) by means of a rope or cord 27 passing over a pulley 28, journaled to the frame of the press. The rope or cord passes forwardly from the rod 26, thence around the pulley, and back to the traverser, to which it is connected at 29. Surrounding the rod between a cross-piece 30 of the press and a nut or projection 31 on the rod, is a coil-spring 32. The action of this spring is to move the rod in the direction indicated by the arrow in Fig. VI, and in doing so to assist in moving the traverser back. The end of the rod 26 preferably enters and is supported by a sleeve 33, secured to the press. (See Fig. XII.)

For the purpose of regulating the density of the bales, the delivery end of the baling-chamber is contracted at will by means of a device shown in Figs. IX and X, which consists of rods 35, connected to the bottom of the baling-chamber and extending upwardly through the top of the baling-chamber. On their upper ends is a cross-head 36, between which and a cross-head 37, resting on the top of the baling-chamber, is a screw 38, which has threaded connection with a block 39, bearing against the cross-head 36, and which is stepped into a block 40, resting on the cross-head 37. The screw is provided with a ratchet-wheel or disk 41, and to it is pivoted the inner end of a lever 42.

To the lever is pivoted a double-ended dog or pawl 43, to the opposite ends of which rods 44 are connected at one end, the rods being connected at the other end to a plate 45, pivoted at 46 to the lever 42, and it has hand-pieces 47. By moving one of the hand-pieces into line with the lever, one end of the dog will be brought into engagement with the ratchet-wheel, and then by moving the lever in the proper direction the screw will force the bottom and top of the baling-chamber toward each other, and by moving the other hand-piece into line with the lever and then operating the lever the screw will be turned to move the top and bottom of the baling-chamber away from each other, or to allow them to spring away from each other. In this manner I am enabled to contract the delivery end of the baling-chamber at will to give the required resistance to the passage of the bale, and accordingly regulate the density to which the bales are pressed.

50 represents a hopper or deposit-chamber located over the opening 51, through which the material passes into the baling-chamber. This hopper has a partial bottom 52 extending from the opening 51. The sides and rear end of the hopper are fixed, but the front end 53 is movable.

Each time the sweep is operated the end 53 of the hopper is moved inwardly and compresses the material in the hopper prior to its falling into the baling-chamber. The end 53 of the hopper is thus moved inwardly, preferably by means of the sweep, which has vertical posts 54 connected by a cross-strip 55. When the sweep is moved in the direction indicated by the arrow in Fig. IV, one of the posts 54 comes against one end of a sliding frame 56, as shown at 57. The frame 56 is connected by strips 58 to the end 53 of the hopper, and it (the frame) is guided on rods 59, which pass through the frame and through cross-pieces 60, forming part of the body of the press. It will thus be seen that each time the sweep is moved around to the position shown in full lines, Fig. IV, one of the posts 54 will come against one end of the frame 56, and then as the sweep is moved to the position shown in dotted lines, Fig. IV, the frame 56 will be moved forward to the position shown in dotted lines, Fig. IV. This moves the end 53 of the hopper forward and compresses the material in the hopper. Of course while this is being done the traverser is being moved forward, pressing the preceding charge of material into the far end of the baling-chamber, and when the traverser recedes (by turning the sweep around in the other direction) the end 53 of the hopper recedes and the material pressed in the hopper falls into the baling-chamber through the opening 51. (See Fig. VI.) In the movement of the traverser in the other direction from that shown in Fig. IV the other post 54 comes against the other end of the frame 56, and the end 53 of the hopper is again pushed forward, compressing another charge of material, and thus the operation goes on continuously.

By the use of the compressor for condensing the material in the hopper I am enabled to build a press with much less movement of the traverser, because the bulk of the material as it enters the baling-chamber is greatly reduced and covers much less area than it would were it not thus compressed. In other words, the compressor accomplishes a certain amount of the work of the traverser in condensing the material at the first stage of the baling. The end 53 of the hopper is forced outwardly, when the sweep relieves it, by means of a coil-spring 62 on one of the rods 59 and located between the outer piece of the frame 56 and the inner cross-strip 60. As the frame is moved inwardly this spring is compressed, and then when the frame is released this spring moves outwardly, carrying the end 53 with it.

70 represents a guy-rod for supporting the sweep. The outer end of this rod is connected to the sweep and the inner end is connected to an arch 63, secured to the body of the press and having an arm 64, that extends inwardly and is secured to the cross-piece 60.

I do not claim the springs 18 and their attachments as being essential to the proper working of my press, as they may be dispensed with without affecting its operation in a material way.

I claim as my invention—

1. The combination, with a traverser and a jointed pitman connected at its inner end to the traverser and at its outer end to a fixed point, of a sweep having a head connected to a fixed point between the traverser and the fixed point of the pitman, formed with inner prongs or fingers having convex and concave bearing-surfaces, substantially as described.

2. The combination, with a traverser, of the jointed pitman having a friction-roller at the joint, and the sweep having a head connected to a fixed point between the traverser and the outer fixed point of the pitman, formed with inner prongs or fingers adapted to bear on the roller of the pitman, substantially as described.

3. The combination, with the frame, the traverser, and the jointed pitman, of the plates 18, bolts 20 and 21, and springs 23, substantially as described.

4. The combination, with a frame and a traverser, of the jointed pitman having bent upper and lower links 3ª, provided with rollers 25, and the upper and lower semicircular tracks 24, supported on the frame, forming guides for the outer part of the pitman and extending between the bent portions of the links and the joint of the pitman, substantially as described.

5. The combination, with a frame and a traverser, of the returning device for the traverser, consisting of the rope 27, passed through the frame, the cross-piece 30, the sleeve 33, the rod 26, sliding in the cross-piece and in the sleeve, having a projection 31, and a spring 32 between the cross-piece and the projection, substantially as described.

6. The combination, with a frame and a traverser, of the returning device for the traverser, consisting of the rope 27, passed through the frame, the pulley 28, the cross-piece 30, the sleeve 33, the rod 26, sliding in the cross-piece and in the sleeve, having a projection 31, and a spring 32 between the cross-piece and the projection, substantially as described.

7. The combination, with a frame having a baling-chamber formed with a yielding delivery end, of the rods 35, cross-heads 36 and 37, blocks 39 and 40 on the cross-heads, screw 38, turning on the lower block and working in the upper block, provided with a ratchet-wheel 41, lever 42, pivoted to the screw, double pawl 43, pivoted to the lever, plate 45, pivoted to the lever, having hand-pieces 47, and the rods 44 on opposite sides of the lever connecting the double dog with the plate, substantially as described.

8. The combination, with a frame having a hopper over the baling-chamber formed with a movable front end, of the sweep having a head, the posts on the sweep, the guide-rods, the frame 56, sliding on the guide-rods, the strips connecting the front end of the hopper with the sliding frame, and means for returning the latter, substantially as described.

9. The combination of a traverser, a sweep having a head for operating the traverser, a hopper having a bottom 52 and a movable end 53, and a frame 56, against which the sweep impinges and which is connected to the movable end of the hopper, substantially as described.

10. The combination of a sweep having a head, a hopper having a bottom 52 and a movable end 53, and a frame 56, against which the sweep impinges and which is connected to the movable end of the hopper, substantially as described.

11. The combination of a traverser, a sweep having a head for operating the traverser, having posts 54, a hopper having a bottom 52 and movable end 53, a frame 56, connected to the movable end 53, guide-rods 59, and spring 62, substantially as described.

WILLIAM A. LAIDLAW.

In presence of—
JOSEPH LUCAS,
A. BURNS.